United States Patent
Lim et al.

(10) Patent No.: US 11,166,097 B2
(45) Date of Patent: Nov. 2, 2021

(54) REMOTE CONTROL APPARATUS AND ELECTRONIC DEVICE, AND SYSTEM INCLUDING SAME

(71) Applicant: SAMSUNG ELECTRONICS CO., LTD., Suwon-si (KR)

(72) Inventors: Chae-young Lim, Bucheon-si (KR); Je-hwan Seo, Daegu (KR); Kyung-ik Cho, Suwon-si (KR); Min-sup Kim, Suwon-si (KR); Ki-hyun Song, Suwon-si (KR); Suk-hoon Yoon, Yongin-si (KR); Hyun-kyu Yun, Seoul (KR); Jong-keun Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/648,926

(22) PCT Filed: Sep. 20, 2018

(86) PCT No.: PCT/KR2018/011084
§ 371 (c)(1),
(2) Date: Mar. 19, 2020

(87) PCT Pub. No.: WO2019/074222
PCT Pub. Date: Apr. 18, 2019

(65) Prior Publication Data
US 2020/0288238 A1 Sep. 10, 2020

(30) Foreign Application Priority Data
Oct. 13, 2017 (KR) ........................ 10-2017-0133328

(51) Int. Cl.
*H04R 3/00* (2006.01)
*H04W 76/14* (2018.01)
*G08C 23/02* (2006.01)

(52) U.S. Cl.
CPC ............... *H04R 3/00* (2013.01); *G08C 23/02* (2013.01); *H04W 76/14* (2018.02); *H04R 2430/01* (2013.01)

(58) Field of Classification Search
CPC ...... H04R 3/00; H04R 2430/01; H04R 25/55; H04R 25/558; H04W 76/14; G08C 23/02
(Continued)

(56) References Cited

U.S. PATENT DOCUMENTS 10,172,169 B2  1/2019  Lee et al.
10,587,743 B2  3/2020  Zhao et al.
(Continued)

FOREIGN PATENT DOCUMENTS

JP  2003-304590  10/2003
JP  2012-049634  3/2012
(Continued)

OTHER PUBLICATIONS

International Search Report for PCT/KR2018/011084, dated Jan. 3, 2019, 4 pages.
(Continued)

*Primary Examiner* — William A Jerez Lora
(74) *Attorney, Agent, or Firm* — Nixon & Vanderhye, P.C.

(57) ABSTRACT

A remote control apparatus is disclosed. The remote control apparatus comprises: a microphone; a communication unit; a storage unit for storing pattern information of a non-audible sound for identification of the locality of an external electronic device; and a processor for broadcasting, through the communication unit, information acquired on the basis of an ambient sound received through the microphone, and when a non-audible sound based on broadcasted information output from an electronic device is received through the microphone, comparing a pattern of the received non-au-
(Continued)

dible sound with pattern information stored in the storage unit, and transmitting a pairing request signal to the electronic device on the basis of a comparison result.

10 Claims, 12 Drawing Sheets

(58) Field of Classification Search
USPC .............................. 381/56, 57, 58, 105, 315
See application file for complete search history.

(56) References Cited

U.S. PATENT DOCUMENTS

| | | | |
|---|---|---|---|
| 2012/0051187 A1 | 3/2012 | Paulson | |
| 2015/0318874 A1* | 11/2015 | Donaldson | H04W 4/80 367/135 |
| 2016/0178748 A1 | 6/2016 | Shin et al. | |
| 2017/0195499 A1* | 7/2017 | Eischeid | G10L 21/0364 |
| 2017/0302779 A1 | 10/2017 | Zhao et al. | |
| 2017/0353979 A1 | 12/2017 | Lee et al. | |
| 2020/0259887 A1* | 8/2020 | Hatambeiki | H04L 67/10 |

FOREIGN PATENT DOCUMENTS

| | | |
|---|---|---|
| JP | 6099331 | 3/2017 |
| KR | 10-0481274 | 4/2005 |
| KR | 10-1021592 | 3/2011 |
| KR | 10-1462427 | 11/2014 |
| KR | 10-1595373 | 2/2016 |
| KR | 10-2016-0034801 | 3/2016 |
| KR | 10-2016-0049347 | 5/2016 |
| WO | 2016/039598 | 3/2016 |

OTHER PUBLICATIONS

Written Opinion of the ISA for PCT/KR2018/011084, dated Jan. 3, 2019, 14 pages.
Office Action dated Aug. 9, 2021 in counterpart KR Application No. 10-2017-0133328 and English-language translation.

* cited by examiner

| Test No. | DISTANCE (METER) | SOUND VOLUME | SUCCESS RATE (NUMBER OF SUCCESS / NUMBER OF ATTEMPT) |
|---|---|---|---|
| 1 | 1 M | 5 volume | 98% (98 / 100) |
| 2 | | 10 volume | 100% (100 / 100) |
| 3 | | 20 volume | 100% (100 / 100) |
| 4 | 3 M | 5 volume | 79% (79 / 100) |
| 5 | | 10 volume | 100% (100 / 100) |
| 6 | | 20 volume | 100% (100 / 100) |
| 7 | 6 M | 5 volume | 0% (0 / 100) |
| 8 | | 10 volume | 79% (79 / 100) |
| 9 | | 20 volume | 100% (100 / 100) |

FIG. 3B
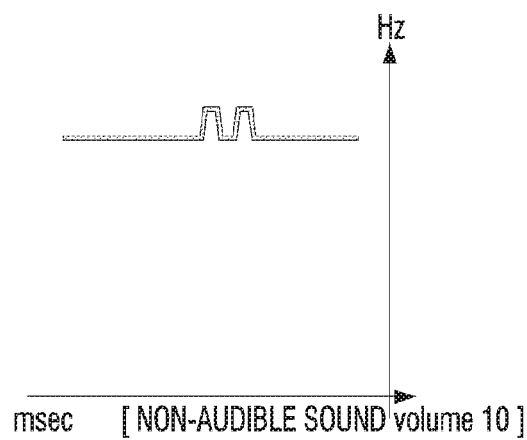
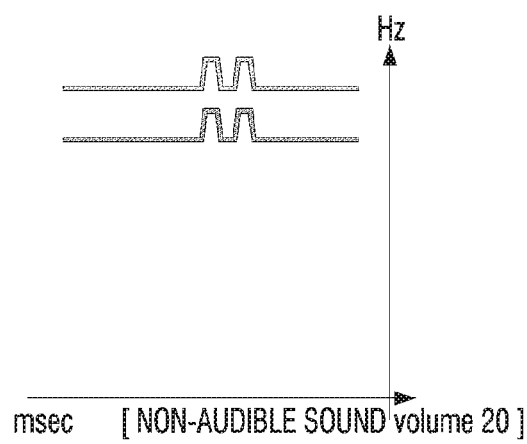
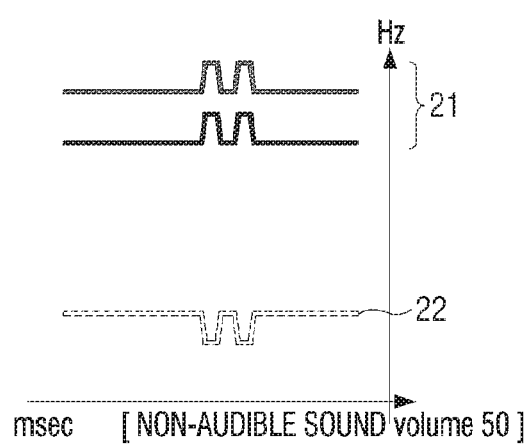

REMOTE CONTROL APPARATUS AND ELECTRONIC DEVICE, AND SYSTEM INCLUDING SAME

This application is the U.S. national phase of International Application No. PCT/KR2018/011084 filed 20 Sep. 2018 which designated the U.S. and claims priority to KR Application No. 10-2017-0133328 filed 13 Oct. 2017, the entire contents of each of which are hereby incorporated by reference.

TECHNICAL FIELD

Apparatuses and methods consistent with the disclosure relates to a remote controller and an electronic device which identify locality of an external electronic device and performs pairing, and a system thereof.

BACKGROUND ART

Development of electronic technologies enables development and distribution of various types of electronic devices. In particular, a remote controller capable of controlling external electronic devices used in various places such as homes, offices, public places, etc. have been continuously developed in recent years.

These days, electronic devices using radio frequency (RF) communication, instead of the conventional infrared ray (IR) communication, have been popular.

A remote controller using RF communication has an advantage that a large amount of information can be transmitted at high speed to control an electronic device, but a user may feel inconvenient, since the remote controller can unintentionally control an electronic device in another space.

Accordingly, there is need for a process (locality check) for checking only an electronic device (for example, an electronic device in a user's home) in a user's space in a process prior to performing the RF communication.

SUMMARY

According to an embodiment of the disclosure, it is provided a remote controller and an electronic device which identify locality of an external electronic device by using non-audible sound outputting from an external electronic device and performs pairing, and a system thereof.

One or more embodiments provide a remote controller which includes a microphone, a communicator, a storage configured to store pattern information of a non-audible sound to identify locality of an external electronic device, and a processor to broadcast information, through the communicator, that is obtained based on ambient sound received through the microphone, and based on non-audible sound based on the broadcast information that is output from the electronic device being received through the microphone, compare pattern information that is stored in the storage, and request a pairing request signal to the electronic device based on the comparison result.

According to another exemplary embodiment, the processor may identify at least one of second volume and second frequency of the non-audible sound based on at least one of first volume and first frequency of the ambient sound, and broadcast information on at least one of the identified second volume and second frequency through the communicator.

According to still another exemplary embodiment, the processor broadcast a communication connection request signal, and when response signals with respect to the communication connection request signal are received respectively from a plurality of external electronic devices including the electronic device, broadcast a signal including identification information of the electronic device and the obtained information based on volume of the response signal.

According to still another exemplary embodiment, the communication connection request signal may be transmitted through a Bluetooth Undirected Advertisement packet, and a signal including identification of the electronic device and the obtained information is transmitted through a Bluetooth Directed Advertisement packet.

According to still another exemplary embodiment, information obtained based on the ambient sound that is received through the microphone may include information on volume of the ambient sound, and the processor, after broadcasting a signal including identification of the electronic device and the obtained information, when the non-audible sound is not received within a predetermined time, update information on volume of the ambient sound, and broadcast a signal including identification information of the electronic device and information on volume of the updated ambient sound.

According to still another exemplary embodiment, the processor may obtain volume which exceeds a predetermined threshold than volume of the ambient sound as volume of the non-audible sound, and after broadcasting the size of the obtained non-audible sound and identification information of the electronic device, based on the non-audible sound not being received within the predetermined time, broadcast instructions to adjust identification information of the electronic device and volume of the non-audible sound upward.

According to an exemplary embodiment, an electronic device includes a speaker, a communicator, a storage configured to store pattern information of non-audible sound for locality identification of the remote controller and the electronic device, and a processor may, based on information on ambient sound of the remote controller being received from the remote controller through the communicator, output non-audible sound based on the received information and the stored pattern information through the speaker, and based on a pairing request signal being received from the remote controller, perform pairing with the remote controller.

According to another exemplary embodiment, the processor may control the speaker to output the non-audible sound with volume that exceeds a predetermined threshold that is greater than the volume of the ambient sound based on the received information, and after outputting the non-audible sound, if the pairing request signal not being received within a predetermined time, control the speaker to adjust volume of the non-audible sound upward and output the same.

According to still another exemplary embodiment, the processor may, based on at least one of volume and frequency of sound included in information on the ambient sound, identify at least one of the stored pattern information and output the non-audible sound based on the identified pattern information.

According to an exemplary embodiment, a controlling method of a remote controller includes broadcasting information obtained based on ambient sound; based on non-audible sound being received from an external electronic device based on the broadcast information, comparing a pattern of the received non-audible sound and prestored pattern information; and transmitting a pairing request signal to the electronic device based on the comparison result.

According to still another exemplary embodiment, the broadcasting the obtained information may include identifying at least one of second volume and second frequency of the non-audible sound based on at least one of first volume and first frequency of the ambient sound, and broadcasting information on at least one of the identified second volume and second frequency.

According to still another exemplary embodiment, the method may further include broadcasting a communication connection request signal, and the broadcasting the obtained information may include, when response signals with respect to the communication connection request signal are received respectively from a plurality of external electronic devices including the electronic device, broadcasting a signal including identification information of the electronic device and the obtained information based on volume of the response signal.

According to still another exemplary embodiment, the communication connection request signal is transmitted through a Bluetooth Undirected Advertisement packet, and a signal including identification of the electronic device and the obtained information is transmitted through a Bluetooth Directed Advertisement packet.

According to still another exemplary embodiment, information obtained based on the ambient sound that is received through the microphone includes information on volume of the ambient sound, and the method may further include, after broadcasting a signal including identification of the electronic device and the obtained information, when the non-audible sound is not received within a predetermined time, updating information on volume of the ambient sound, and broadcasting a signal including identification information of the electronic device and information on volume of the updated ambient sound.

According to still another exemplary embodiment, the broadcasting a signal including identification information of the electronic device and information on volume of the updated ambient sound may further include obtaining volume which exceeds a predetermined threshold than volume of the ambient sound as volume of the non-audible sound; and after broadcasting the size of the obtained non-audible sound and identification information of the electronic device, based on the non-audible sound not being received within the predetermined time, broadcasting instructions to adjust identification information of the electronic device and volume of the non-audible sound upward.

According to an exemplary embodiment, an electronic system includes an electronic device and a remote controller which store pattern information of non-audible sound for locality identification, a remote controller configured to broadcast information obtained based on ambient sound received through a microphone; and based on information on the ambient sound of the remote controller being received, an electronic device configured to output non-audible sound based on the received information and the stored pattern information, and the remote controller may, based on the non-audible sound that is output from the electronic device being received, compare a pattern of the received non-audible sound and the stored pattern information and transmit a pairing request signal to the electronic device based on the comparison result.

As described above, according to various exemplary embodiments, a user may identify the electronic device in the local area and perform pairing without extra manipulation, thereby improving user convenience.

BRIEF DESCRIPTION OF THE DRAWINGS

FIGS. 3A and 3B are views to describe volume of non-audible sound according to an exemplary embodiment.

DETAILED DESCRIPTION OF EXAMPLE EMBODIMENTS

Figure 1:
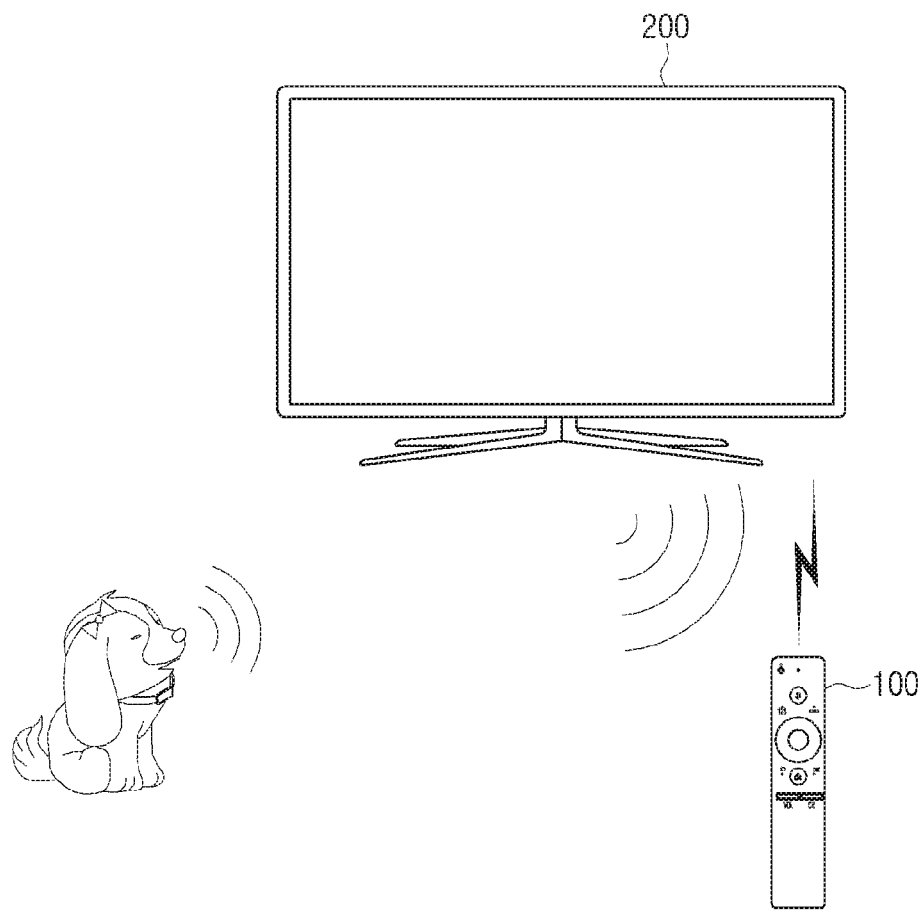
FIG. 1 is a view illustrating an electronic system according to an exemplary embodiment.

Certain embodiments will now be described in greater detail with reference to the accompanying drawings. Hereinafter, the present disclosure will be described in detail with reference to the drawings. In the following description of the present disclosure, detailed description of known functions and configurations incorporated herein will be omitted when it may make the subject matter of the present disclosure rather unclear. In addition, the following embodiments can be modified into various other forms, and the scope of the technical idea of the present disclosure is not limited to the following examples. Rather, these embodiments are provided so that this disclosure will be more thorough and complete, and will fully convey the scope of the present disclosure to those skilled in the art.

Also, to "include" an element means that it may include other elements, but not other elements, unless specifically stated otherwise. Further, various elements and regions in the drawings are schematically drawn. Accordingly, the spirit of the present disclosure is not limited by the relative size or spacing depicted in the accompanying drawings.

FIG. 1 is a view illustrating an electronic system according to an exemplary embodiment.

To be specific, an electronic system 100 according to an exemplary embodiment includes a remote controller 100 and an electronic device 200.

According to an exemplary embodiment, the remote controller 100 remotely controls the electronic device 200 through various wireless and wired communication methods. For example, communication can be performed through various well-known methods such as Bluetooth (BT), infrared (IR), wireless fidelity (WI-FI), Zigbee, beacon, near field communication (NFC) and so on, it is not limited thereto.

According to one embodiment of the present disclosure, the electronic device 200 is controlled in accordance with a remote control signal of the remote controller 100. For example, the electronic device 200 may be implemented as a display device which includes sound output functions such as a TV, a large format display (LFD), a digital signage, a digital information display (DID), a video wall, and a projector display, and various types of electronic devices which include sound output functions and are controllable by the remote controller 100 such as a wireless/wired speaker, a set-top box, a refrigerator, and an air-conditioner.

According to one embodiment of the present disclosure, the remote controller 100 can control the electronic device 200 through RF communication. Accordingly, a pairing process for performing RE communication between the remote controller 100 and the electronic device 200 may be required.

Pairing refers to a process of registering mutual identification information so that the remote controller 100 and the electronic device 200 can operate in conjunction with each other. According to one embodiment of the present disclosure, the pairing may be performed when the power of the remote controller 100 is turned on for the first time, the power of the electronic device 200 is turned on for the first time, or according to user's pairing start instructions. However, the present disclosure is not limited thereto.

According to an embodiment of the present disclosure, it is possible to easily perform pairing between the remote controller 100 and the electronic device 200 without user operation by using a non-audible sound so that the user can not recognize. Hereinafter, various embodiments of the present disclosure will be described in detail.

Figure 2:
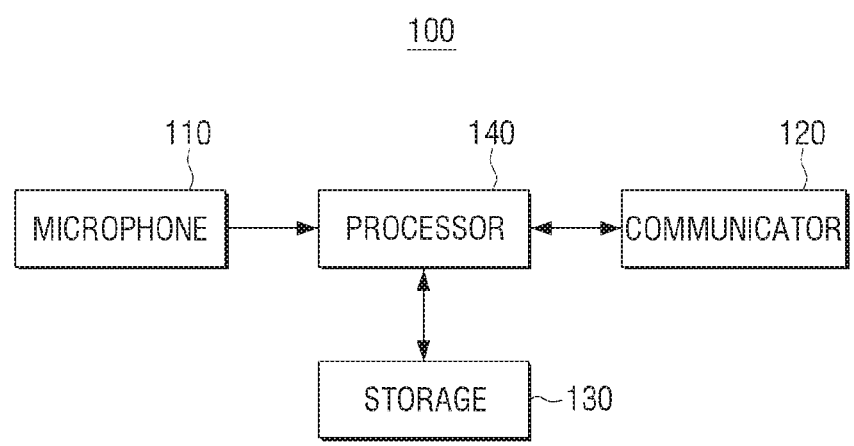
FIG. 2 is a block diagram illustrating a configuration of a remote controller according to an exemplary embodiment.

FIG. 2 is a block diagram illustrating a configuration of a remote controller according to an exemplary embodiment.

According to FIG. 2, the remote controller 100 includes a microphone 110, a communicator 120, a storage 130, and a processor 140.

The microphone 110 receives sound and transmits sound to the processor 140. The microphone 110 may include at least one microphone.

For example, the microphone 110 may convert the recorded analog sound signal into a digital signal through a pulse code modulation (PCM) method and provide the digital signal to the processor 140. However, in some cases, the microphone 110 may provide the recorded analog sound signal to the processor 140 without further signal processing.

The communicator 120 performs communication with an external electronic device (FIG. 1, 200).

According to an embodiment, the communicator 120 may perform RF communication with the external electronic device 200. For example, the communicator 120 may perform blue tooth (BT) communication with the external electronic device 200. However, the present disclosure is not limited thereto, and the communicator 120 can perform various wired wireless communication with the external electronic device 200. For example, the communicator 120 may perform communication through various communication methods such as infrared (IR), wireless fidelity a Zigbee, a beacon, a near field communication (NFC), a wide area network (WAN), Ethernet, IEEE 1394, high definition multimedia interface (HDMI), universal serial bus (USB), mobile high-definition link (MHL), advanced encryption standard (AES) European broadcasting union (EBU), optical, and coaxial.

The storage 130 stores various data that is required for an operation of the remote controller 100.

According to an exemplary embodiment, the storage 130 may store pattern information of non-audible sound and size information of non-audible sound to identify locality of the external electronic device 200.

The storage 130 may be implemented as an internal memory such as a ROM or a RAM included in the processor 140 or may be implemented as a memory that is separate from the processor 140. In this case, the storage 130 may be implemented as a memory embedded in the remote controller 100 or may be implemented as a memory that is detachable from the remote controller 100, depending on the purpose of data storage. For example, data for driving the remote controller 100 may be stored in a memory embedded in the remote controller 100, and data for an extension function of the remote controller 100 may be stored in the memory detachable from the remote controller 100. Meanwhile, the memory embedded in the remote controller 100 may be implemented in the form of a non-volatile memory, a volatile memory, a hard disk drive (HDD), or a solid state drive (SSD).

The processor 140 controls overall operations of the remote controller 100.

According to one embodiment of the present disclosure, the processor 140 may be implemented as a digital signal processor (DSP) for processing a digital signal, a microprocessor, or a time controller (TCON), but are not limited thereto. The processor 140 may include or defined as at least one of a central processing unit (CPU) a microcontroller unit (MCU), a micro processing unit (MPU), a controller, an application processor (AP), a communication processor (CP), and an ARM processor, and the like. The processor 40 may also include one or more of a system on chip (SoC), a large scale integration (LSI), or may be implemented in the form of a field programmable gate array (FPGA).

According to an exemplary embodiment, the processor 140 may broadcast information that is obtained based on the ambient sound received through the microphone 110 through the communicator 120.

Specifically, the processor 140 may obtain information about at least one of the volume and the frequency of the ambient sound received via the microphone 110, and obtain information to be broadcast to the external electronic device 200 based on at least one of the obtained volume and frequency of the ambient sound.

According to the embodiment of the present disclosure, whether the remote controller 100 and the electronic device 200 are present in the locality, that is, the same local area, can be identified, prior to performing pairing using the non-audible sound. Here, the non-audible sound refers to a sound generated in a high frequency band which cannot be easily recognized by a person. Hereinafter, the non-audible sound is a high frequency band which cannot be easily recognized by a person, it usually has a frequency of 20 kHz or higher, or high frequency similar thereto. For example, locality identification may be performed using frequencies equal to or greater than 15 kHz, depending on cases. It is possible to perform the locality identification for performing the pairing without interfering with the video or audio listening when the non-audible sound is used. In addition, since the electronic device 200 includes a speaker for outputting sound, it is possible to identify the localities even when a separate IR transceiver is not provided.

According to one embodiment, the processor 140 may obtain information about the output size of the non-audible sound for locality identification of the external electronic device 200 based on the volume of the ambient sound and broadcast it to the external electronic device 200.

According to another embodiment, the processor 140 may obtain information about the frequency of the non-audible sound for locality identification of the external electronic device 200 based on the frequency of the ambient sound and broadcast it to the external electronic device 200.

For example, when the processor 140 receives a Pulse Code Modulation (PCM) value corresponding to the ambient sound from the microphone 110, the processor 140 may obtain at least one of an average value and a maximum value of the ambient sound (for example, a decibel (dB) value) and determine an output size of the non-audible sound for locality identification based on at least one of the average value and the maximum value of the obtained ambient sound. For example, the processor 140 may determine the volume of the non-audible output to be equal to or greater than a predetermined threshold value than the average value of the ambient sound as the output size of the non-audible sound.

In addition, when the PCM value corresponding to the ambient sound is received, the processor 140 may convert the PCM value into a frequency domain (for example, Fast Fourier Transform (FFT) transformation) to obtain frequency information about the ambient sound. For example, the processor 140 may determine a frequency that is different from the frequency of the ambient sound to be the frequency of the non-audible sound.

A method of converting an analog sound signal to a digital sound signal is not limited to PCM.

Figure 3A:
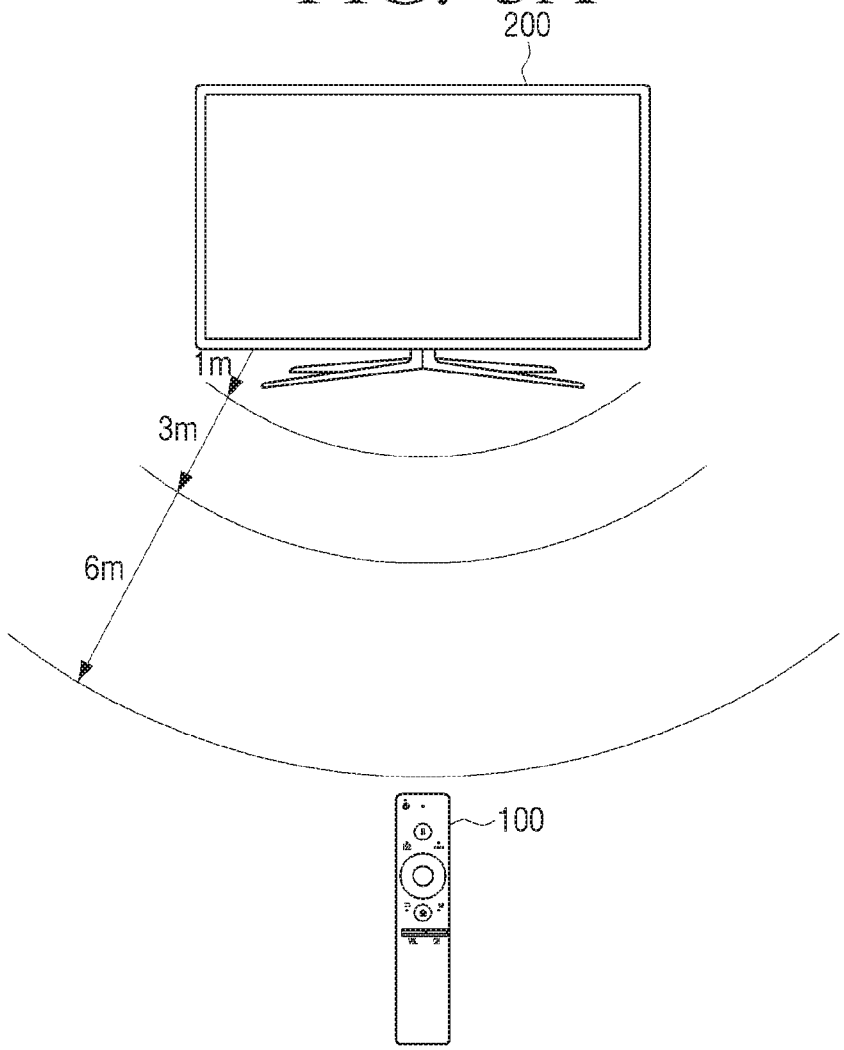

FIGS. 3(a) and 3(b) are views to describe volume of non-audible sound according to an exemplary embodiment.

According to one embodiment of the present disclosure, the electronic device 200 may output a non-audible sound to perform locality identification. Non-audible sound is a kind of sound wave, and energy by sound waves is reduced by the distance divided by the square of the distance. Therefore, as the distance increases for the same sound size as in the table of FIG. 3A, the communication success rate using non-audible sound is significantly lowered.

Accordingly, in order to increase the communication success rate, the output size can be increased to increase the energy of the sound wave itself. For example, when the size of the non-audible sound is 20 volumes as shown in the table of FIG. 3A, since the energy of sound waves is high, the probability that the remote controller 100 receives the sound is high irrespective of the distance. However, referring to FIG. 3B, as the volume of the non-audible sound increases, a noise 22 in the audible frequency band may occur together with the non-audible sound 21.

In FIG. 3B, the horizontal axis represents time, and the vertical axis represents frequency. That is, two frequency pairs may occur differently over time. FIG. 3B shows that the amplitude of the non-audible sound increases, as the frequency pattern of the M-shape shown in FIG. 3B is displayed to be thick. According to FIG. 3B, the noise 22 in the audible frequency band increases as the volume of the non-audible sound 21 increases. Therefore, the higher the non-audible sound volume value is, the more the user can hear the unpleasant noise.

Accordingly, the remote controller 110 may store the value of the non-audible sound volume that can increase communication success rate and minimize unnecessary noise in the audible frequency band in the storage 130.

FIGS. 4(a) to 4(e) are views to describe a frequency pattern of non-audible sound which is used according to an exemplary embodiment.

According to an embodiment, the processor 140 may select one of the frequency patterns of non-audible sound that is stored in the storage 130 based on information of the ambient sound.

According to an embodiment of the present disclosure, various frequency patterns may be stored in the storage 130. The processor 140 can select one of the different frequency patterns according to the volume of the ambient sound and the frequency information of the ambient sound.

Figure 4A:
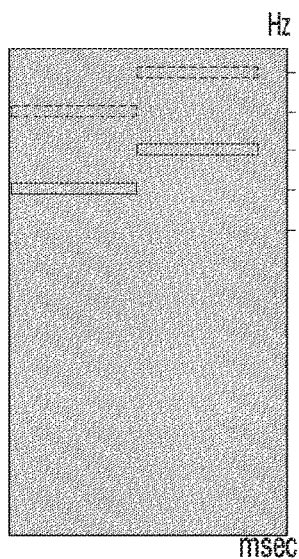
FIGS. 4A, 4B, 4C, 4D, and 4E are views to describe a frequency pattern of non-audible sound which is used according to an exemplary embodiment.
Figure 4B:
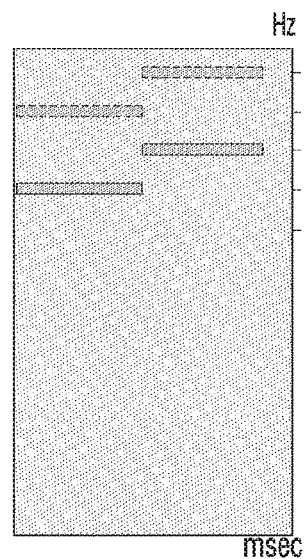
Figure 4C:
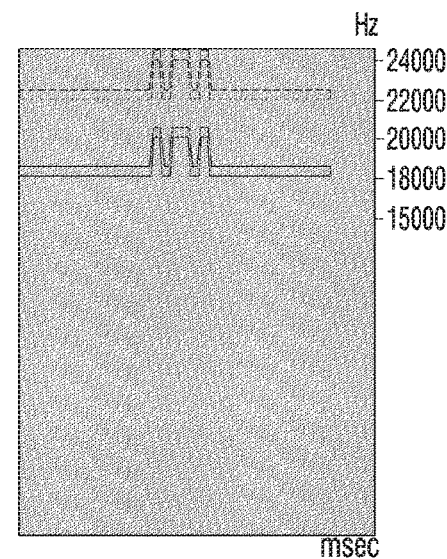
Figure 4D:
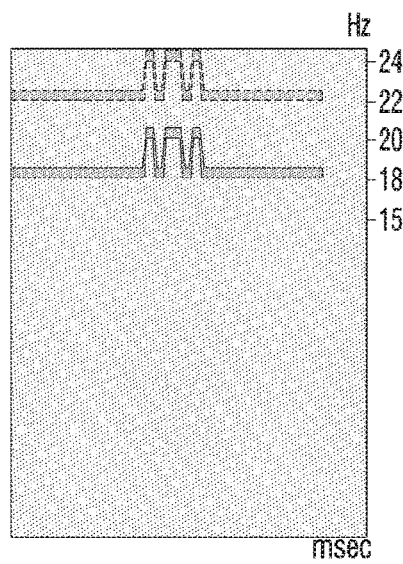

According to one embodiment of the present disclosure, the first pattern shown in FIGS. 4(a) and 4(b) is suitable for situations where the volume of ambient sound (noise) is large, whereas, the second pattern shown in FIGS. 4(c) and 4(d) may not be suitable for situations where the volume of the ambient sound is large compared to the first pattern.

For example, in FIG. 4(a) and FIG. 4(c), the background (hatching) is displayed in a dark state, indicating that volume of the ambient sound is large, and the background (hatching) is displayed in a light state in FIG. 4(b), indicating that the volume of the ambient sound is small.

For example, the ambient sound average dB value in FIGS. 4(a) and 4(c) is 81 dB or more, and the ambient sound average dB value in FIGS. 4(b) and 4(d) is −92 dB or more.

According to FIGS. 4(a) and 4(b), in the case of the first pattern, a range of 17 kHz & 22 kHz is outputted for a relatively long time, and a range of 19 kHz & 24 kHz is continuously outputted after a predetermined time. According to FIGS. 4(c) and 4(d), in the case of the second pattern, the range of 18 kHz & 22 kHz and the range of 20 kHz & 24 kHz are changed and outputted six times in a short period of time.

When comparing FIGS. 4(a) and 4(c) where the volume of the ambient noise is large, the processor 140 can relatively easily identify the non-audible sound of the first pattern shown in FIG. 4(a). In the case of the first pattern, since the time for outputting the sound of the specific frequency is long, even if the sound of the specific frequency cannot be identified at any moment, it is necessary to identify again later. In the meantime, in the case of the second pattern, since the time for outputting the sound of the specific frequency is short, if the sound of the specific frequency cannot be identified at any moment, it is changed to the sound of the next frequency, and it seems difficult to identify again.

Figure 4E:
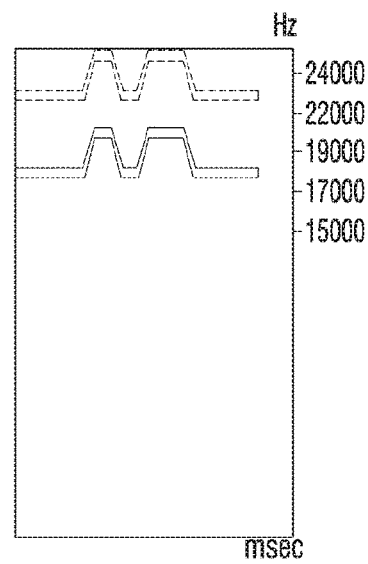

However, the second pattern is advantageous in that it can transmit a large amount of information to the non-audible sound as compared with the first pattern. It is needless to say that a third pattern in which the strengths and weaknesses of the first pattern and the second pattern are appropriately combined as shown in FIG. 4(e) can also be used.

Referring to FIGS. 4(a) and 4(b), the first pattern can only transmit a signal of [01], but referring to FIGS. 4(c) and 4(d), the second pattern may send a signal of [0101010]. Here, the second and third patterns may be generated by modifying the first pattern, but are not limited thereto.

The processor 140 may select either the first pattern, the second pattern, or the third pattern based on at least one of the ambient sound information and the amount of information transmitted from the electronic device 200 in a non-audible manner, and may broadcast information on the selected frequency pattern.

According to an exemplary embodiment, when the frequency pattern information stored in the storage 130 includes information on a pattern and information on a frequency size per ambient sound information, the processor 130 may select the frequency pattern information based on at least one of the ambient sound information and the amount of information to be transmitted in the non-audible sound in the electronic device 200, and broadcast the information.

According to another embodiment, when the frequency pattern information stored in the storage 130 includes information on a pattern without information on the frequency volume, according to an exemplary embodiment, the processor 140 may obtain frequency pattern information reflecting non-audible sound frequency information and ambient sound information to the pattern information and broadcast the information. According to another example, the processor 140 may broadcast pattern information, non-audible sound frequency information and ambient sound information. In the case of the latter, the electronic device 200 which receives the information may obtain and output non-audible sound of a specific frequency pattern based on pattern information, non-audible sound frequency information, and ambient sound information.

For example, the processor 140 may extract the volume component of each frequency by converting the ambient sound received through the microphone 110 into the frequency domain. For example, the processor 140 may identify that the volume of the ambient sound is particularly large at 18 kHz to 2.2 kHz. In this case, a first pattern having frequencies of 24, 26, 28, and 30 kHz may be formed instead of the binary patterns having frequencies of 17, 19, 22, and 24 kHz shown in FIG. 4(a). That is, the processor 140 can form the first pattern by avoiding the frequency band in which the volume of the ambient sound is concentrated.

As such, the processor 140 may obtain non-audible sound frequency pattern information based on information of the ambient sound. In the meantime, according to FIG. 5, information on volume of non-audible sound can be obtained based on the ambient sound information.

Figure 5:
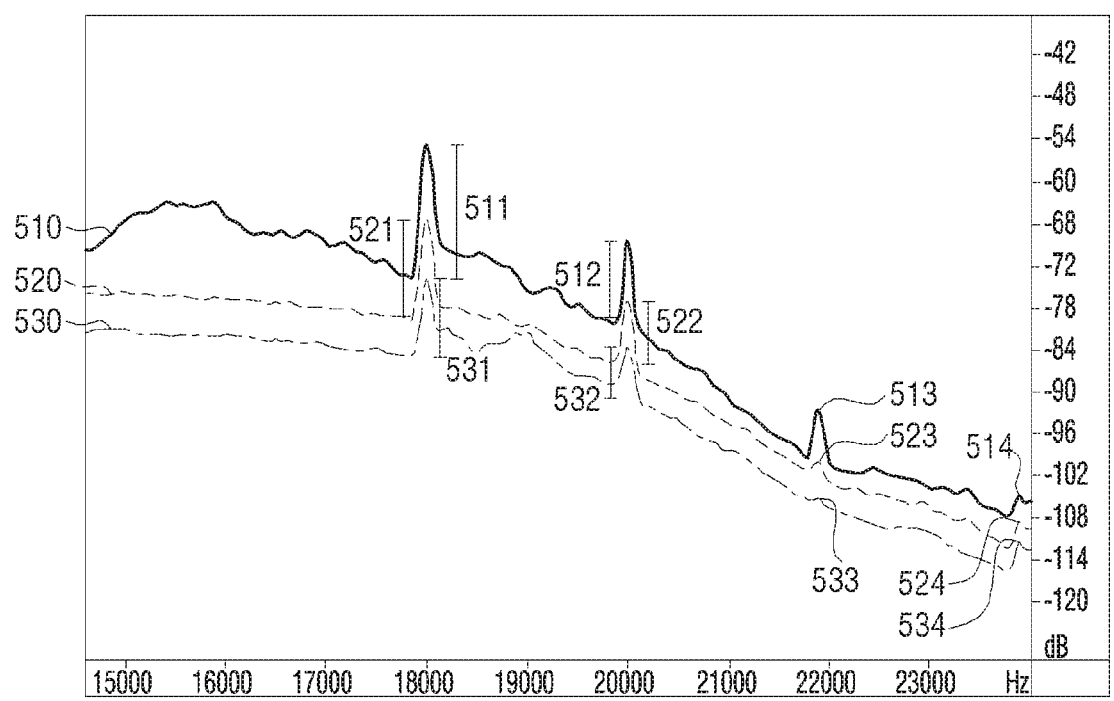
FIG. 5 is a view to describe volume of non-audible sound which is used according to an exemplary embodiment.

FIG. 5 is a view to describe volume of non-audible sound which is used according to an exemplary embodiment.

According to another exemplary embodiment, the processor 140 may select one of the volume of non-audible sound which is stored in the storage 130 based on the volume of the ambient sound and frequency information of the ambient sound.

To be specific, the processor 140 may select different non-audible sound volume values 511, 521, 531 according to volume of ambient sound 510, 520, 530.

For example, as illustrated in FIG. 4(e), it can be assumed that there is a case of outputting the non-audible sound using a frequency pattern having frequencies of 18 kHz, 20 kHz, 22 kHz, 24 kHz. In this case, as illustrated in FIG. 5, there may be frequencies of 18 kHz, 20 kHz, 22 kHz, 24 kHz, and non-audible sound can be output.

According to FIG. 5, when the ambient sound dB is greater than or equal to −81 dB on average, the processor 140 causes the non-audible sounds 511 through 514 having frequency patterns of about 18 kHz, 20 kHz, 22 kHz, 24 kHz to be output in the electronic device 200. In addition, if the ambient sound dB is greater than or equal to −89 dB on average 520, the processor 140 causes the electronic device 200 to output non-audible sounds 521 to 524 with frequency patterns of about 18 kHz, 20 kHz, 22 kHz, 24 kHz in the electronic device 200. In the meantime, if the ambient sound dB is greater than or equal to an average of −92 dB 530, the processor 140 causes the electronic device 200 to output non-audible sounds 531 to 534 having frequency patterns of about 18 kHz, 20 kHz, 2.2 kHz, and 24 kHz.

According to one embodiment of the present disclosure, when the ambient sound dB is equal to or greater than −81 dB on average 510, the size of the non-audible sound 511 corresponding to 18 kHz in the frequency pattern of the non-audible sound may be set to approximately 10 dB. Also, when the ambient sound dB is equal to or greater than −89 dB on average 520, the size of the non-audible sound 521 corresponding to 18 kHz in the frequency pattern of the non-audible sound can be set to approximately 8 dB. In the meantime, when the ambient sound dB is equal to or greater than −92 dB on average 530, the size of the non-audible sound 531 corresponding to 18 kHz in the frequency pattern of the non-audible sound can be set to approximately 4 dB.

In the meantime, the predetermined 10 dB, 8 dB, and 4 dB are one of the dB values that can have communication success rate of 99.9% or more. The dB is not limited thereto, and the dB value may be set to a value which can improve non-audible communication success rate and generate noise less than a predetermined size in an audible range.

The aforementioned values of the volume of the non-audible sound can be stored in the storage 130. The processor 140 may obtain volume of non-audible sound that is stored in the storage 130 according to information of the ambient sound.

According to an exemplary embodiment, the values 511, 521, 531 of the volume of non-audible sound show a success rate of 99.9% in the 10 m distance, and can be set to a value which may cause success of non-audible communication.

In this case, among the volume increase values which can cause success of non-audible communication with the success rate of 99.9% in the 10 m distance, the smallest value can be selected. As described above, noise in the audible range grows as sound of the non-audible range increases.

According to another embodiment of the present disclosure, the volume at each frequency may be different for a particular non-audible frequency pattern. That is, the volume 511 of the non-audible sound at 18 kHz, the volume 512 of the non-audible sound at 20 kHz, the volume 513 of the non-audible sound at 22 kHz, and the volume 514 of non-audible sound at 24 kHz can be different.

According to an embodiment of the present disclosure, the volume value of the non-audible pre-stored in the storage 130 may be retrieved. However, the processor 140 may acquire information on the ambient sound, and determine the volume value of the non-audible sound for performing effective communication. In addition, the processor 240 of the electronic device 200 may obtain information about the ambient sound from the remote controller 100 and determine the volume value of the non-audible sound capable of performing valid communication.

As such, the processor 140 may obtain information on volume of non-audible sound based on information of the ambient sound.

Figure 6:
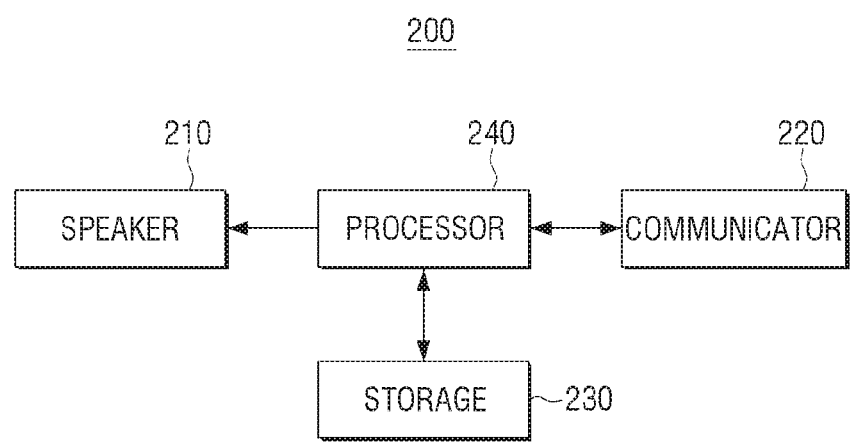
FIG. 6 is a block diagram illustrating a configuration of an electronic device according to an exemplary embodiment.

FIG. 6 is a block diagram illustrating a configuration of an electronic device according to an exemplary embodiment.

According to FIG. 6, the electronic device 200 may include a speaker 210, a communicator 220, a storage 230, and a processor 240.

The speaker 210 according to an embodiment of the present disclosure can output sound transmitted from the processor 240 in the electronic device 200 in various frequency bands. At this time, the speaker 210 can output not only the frequency of the audible range but also the sound of the non-audible range frequency. Meanwhile, a plurality of speakers may be provided in the electronic device 200, but the present disclosure is not limited thereto.

In the meantime, the communicator 220 according to an exemplary embodiment can be embodied in the communicator 120 as various types as described above.

The storage 230 according to an embodiment of the present disclosure may store at least one of the volume information and the frequency pattern of the non-audible sound corresponding to the ambient sound information. Accordingly, the processor 240 can acquire at least one of the volume information of the non-audible sound and the frequency pattern information based on the ambient sound through the storage 230.

In the meantime, the storage 230 according to an exemplary embodiment may be implemented as various types in the storage 130 of the remote controller 100.

The processor 240 according to an exemplary embodiment performs overall control operation of the electronic device 200.

The processor 240 according to an exemplary embodiment of the present disclosure may receive the volume and frequency pattern information of the non-audible sound for the ambient sound to be output from the remote controller 100 to the speaker 210. Accordingly, it is possible to control the speaker 210 to Output the non-audible sound in the volume and frequency pattern of the non-audible sound corresponding to the received information.

For example, the processor 240 may receive information on the frequency pattern and obtain the frequency pattern which is prestored in the storage 230 of the electronic device 200. The processor 240 may control to output non-audible sound based on the obtained frequency pattern.

As another example, the processor 240 may receive at least one of the volume and frequency pattern of the non-audible sound and obtain the volume and frequency pattern that is prestored in the storage 230 of the electronic device 200.

In the meantime, the processor 240 according to another exemplary embodiment may receive information of the ambient sound from the remote controller 100 and identify the volume and frequency pattern to be output to the speaker 210. That is, the processor may receive the ambient sound recorded via microphone from the remote controller 100.

In particular, the processor 240 may analyze the received ambient sound to identify the volume and frequency information of the ambient sound. It is possible to output the non-audible sound by identifying one of the volume value of the non audible sound and the various frequency patterns stored in the storage 230 according to the identified size and frequency information. At this time, among the volume values and frequency patterns of various non-audible sounds stored in the storage 230 the volume value and the frequency pattern of the non-audible sound having the highest success rate can be identified according to the circumstances of the ambient sound.

Then, the processor 240 may control to output the non-audible sound through the speaker 210 and when the pairing request signal is received from the remote controller 100, the processor may perform pairing with the remote controller 100.

The processor 240 of the electronic device may, as described in FIGS. 4(a) to (e) and FIG. 5, obtain information on frequency pattern and volume of non-audible sound based on the information of the ambient sound as the processor 140 of the remote controller.

The processor 240 according to an exemplary embodiment may be implemented as various types as described above with regard to the processor 140 of the remote controller 100.

Figure 7:
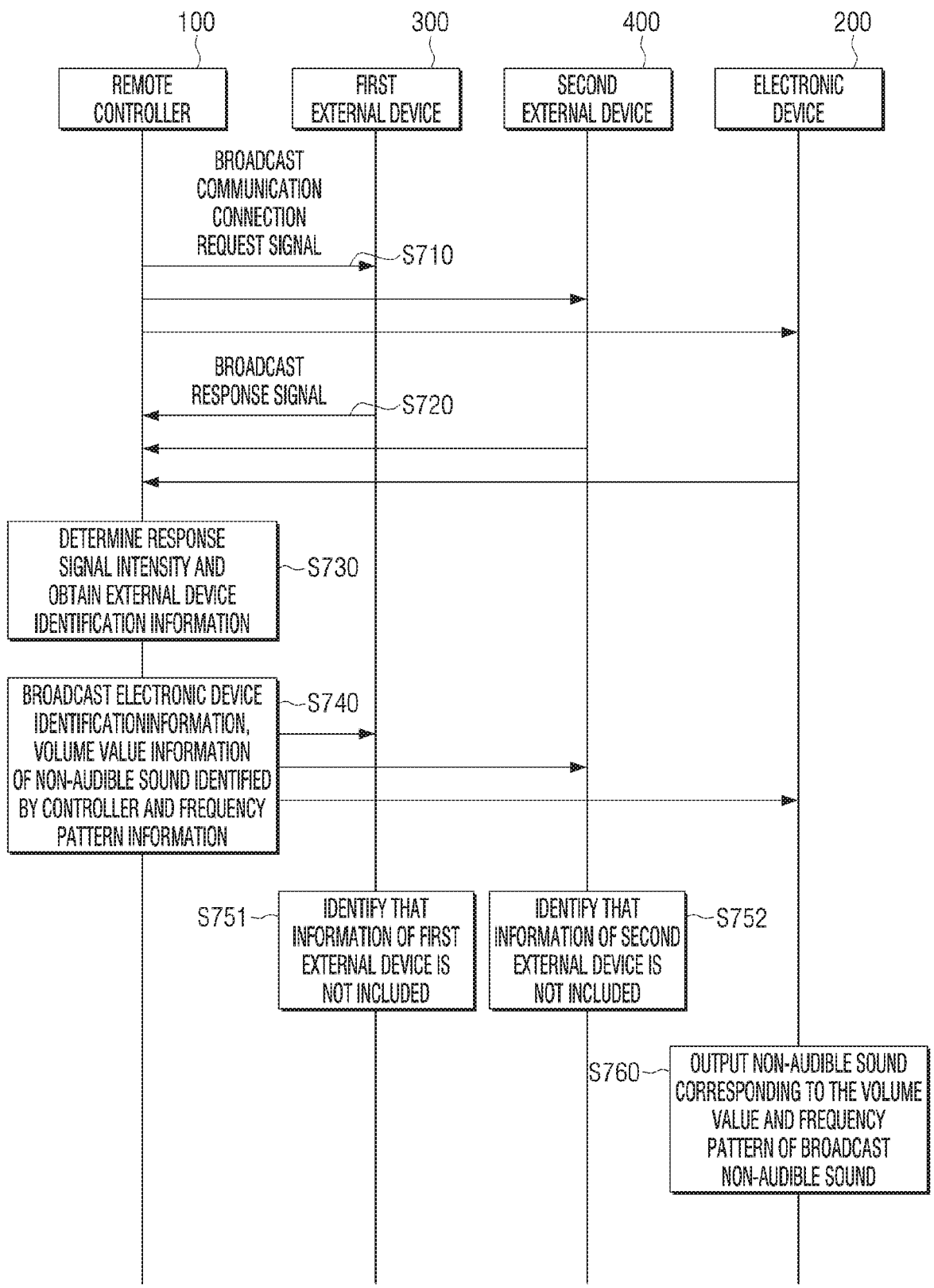
FIG. 7 is a view to describe a process for identifying an electronic device for pairing from among a plurality of external devices according to an exemplary embodiment.

FIG. 7 is a view to describe a process for identifying an electronic device for pairing from among a plurality of external devices according to an exemplary embodiment.

According to an embodiment of the present invention, in addition to the electronic device 200 for pairing with the remote controller 100, a plurality of external devices may be located in one space. The first external device 300 and the second external device 400 may be electronic devices located in different rooms of one household or electronic devices located in different households.

According to one embodiment of the present invention, the processor 140 may broadcast a communication connection request signal, and when a response signal with respect to the communication connection request signal is received from the plurality of external devices 300 and 400 including the electronic device 200, and broadcast identification information of the electronic device 200 and a signal including the obtained information.

Specifically, when the remote controller 100 receives instructions for performing pairing, it can broadcast a communication connection request signal in step S710. Accordingly, the electronic device 200, the first external device 300, and the second external device 400 can broadcast a response signal in step S720. At this time, the identification information of each external device is included in the response signal.

Thereafter, the remote controller 100 can receive the plurality of response signals, determine the strength of the response signal, and obtain the identification information of the electronic device and external devices in step S730. For example, it is possible to obtain the identification information of the electronic device 200 having the largest response signal strength. The identification information of the acquired electronic device 200, the volume value information of the non-audible sound identified by the remote controller, and frequency pattern information can be broadcast in step S740.

Thereafter, all the electronic device 200, the first external device 300, and the second external device 400 can receive the broadcast signal. However, the broadcast signal may include identification information of a specific device, for example, identification information of the electronic device 200. Accordingly, the first external device 300 and the second external device 400 can identify that their own identification information is not included in steps S751 and S752.

Meanwhile, unlike the first external device 300 and the second external device 400, the electronic device 200 can identify that its identification information is included. Accordingly, it is possible to identify that the signal broadcast from the remote controller 100 is a signal for pairing. Accordingly, it is possible to output the non-audible sound corresponding to the volume value and the frequency pattern of the non-audible sound included in the broadcast signal in step S760.

According to an exemplary embodiment, not only in the case in which there are several external devices as illustrated in FIG. 7, but in the case in which there is only the electronic device 200 without the first external device 300 and the second external device 400, a similar process can be implemented.

Specifically, when the remote controller 100 broadcasts a communication connection request signal to the electronic device 200, the electronic device 200 can broadcast a response signal. The remote controller 100 can acquire the identification information of the electronic device 200 included in the received one response signal since the response signal has been received only once. Thereafter, it is possible to broadcast the identification information of the obtained electronic device 200, the volume value information of the non-audible sound identified by the remote controller 100, and the frequency pattern information. Thereafter, the electronic device 200 may output the non-audible sound based on the information contained in the broadcast signal.

According to an embodiment of the present disclosure, the communication connection request signal S710 may be performed by a Bluetooth communication method. Specifically, the step of broadcasting the communication connection request signal is a state in which the identification information of the electronic device 200 is not recognized since the remote controller 100 and the electronic device 200 are in a state before being paired. Accordingly, the remote controller 100 transmits the communication connection request signal in the form of broadcasting to the public rather than transmitting the communication connection request signal to the target device for pairing. That is, the communication connection request signal is transmitted through the Bluetooth Undirected Advertisement packet.

In the meantime, after obtaining the identification information of the electronic device 200 by the response signal, the remote controller 100 can identify the identification information of the device for pairing. However, since the Bluetooth pairing is yet to be performed, it may be difficult to directly transmit information to the electronic device 200. However, if the volume value information and the frequency pattern information of the non-audible sound including the identification information of the electronic device 200 are broadcast, only the electronic device 200 may output the non-audible sound based on the volume value information and the frequency pattern information. Therefore, although communication is performed in a broadcasting method, only the electronic device 200 gets to respond to the signal. That is, the remote controller 100 may be implemented to broadcast (S740) via a Bluetooth Directed Advertisement packet.

Figure 8:
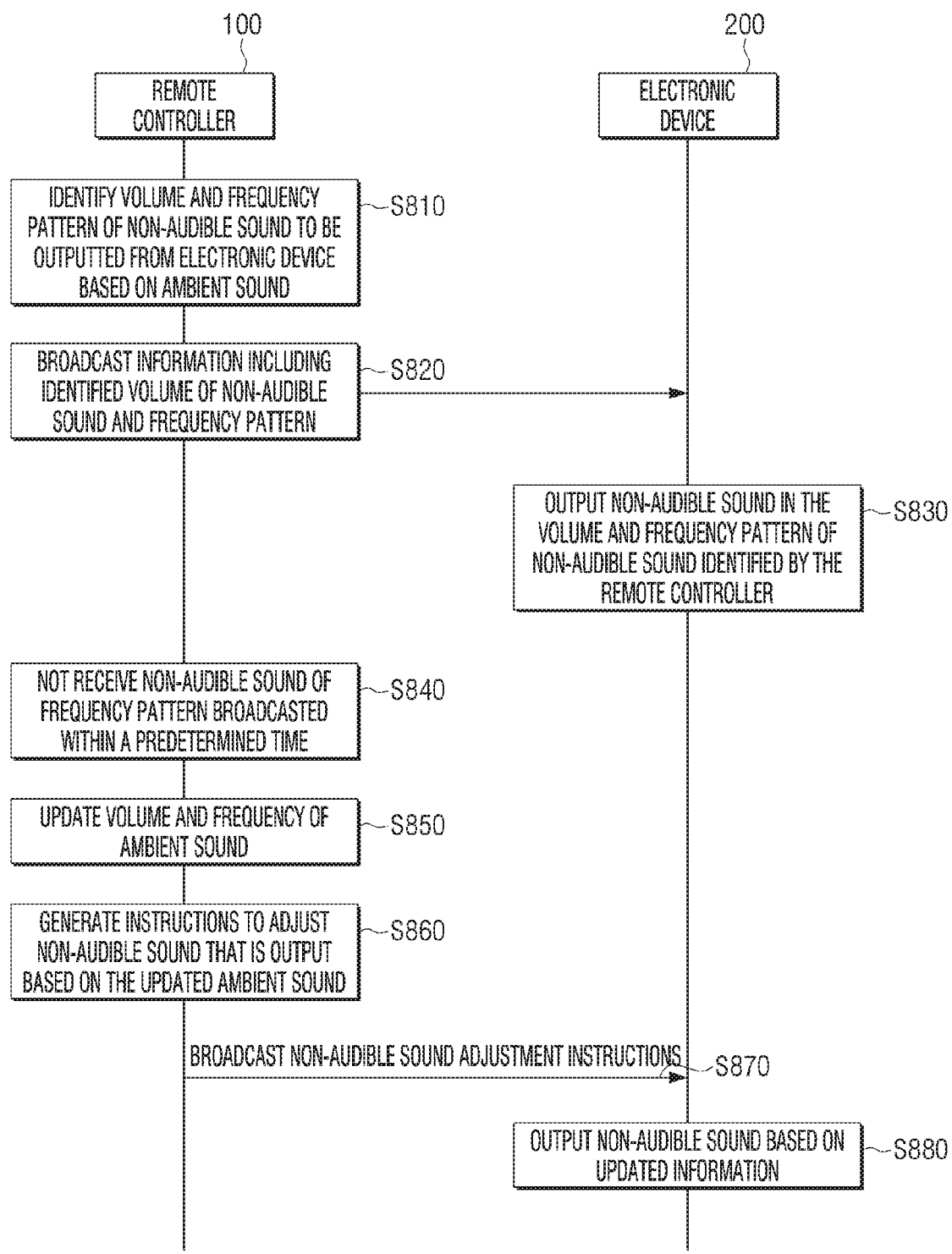
FIG. 8 is a sequence diagram to describe a method of describing an operation of a case where a remote controller does not receive non-audible sound from an electronic device according to an exemplary embodiment.

Accordingly, even if locality identification is performed before performing the pairing with one or more external devices, only the electronic device 200 for pairing can output a non-audible sound having a specific volume value and a frequency pattern, FIG. 8 is a sequence diagram to describe a method of describing an operation of a case where a remote controller does not receive non-audible sound from an electronic device according to an exemplary embodiment.

To be specific, the non-audible sound that is output from the electronic device 200 cannot be received by the remote control device 100 due to change in an obstacle or the ambient sound.

According to one embodiment of the present disclosure, the processor 140 may broadcast a signal including information obtained based on the identification information of the electronic device 200 and the ambient sound. Thereafter, if the non-audible sound is not received within the predetermined time, the information about the volume of the ambient sound is updated, and a signal including information about the identification information of the electronic device 200 and the size of the updated ambient sound may be broadcast.

According to another embodiment of the present disclosure, the processor 140, after obtaining the volume of the non-audible sound exceeding a preset threshold value larger than the volume of the ambient sound as the volume of non-audible sound, may broadcast the volume of the obtained non-audible sound and identification information of the electronic device 200, and when the non-audible sound is not received within a predetermined time, may broadcast instructions to adjust the identification information and the volume of the non-audible sound of the electronic device 200 upward.

Specifically, the remote controller 100 can identify the volume and frequency pattern of the non-audible sound to be outputted from the electronic device 200 based on the ambient sound in step S810. As described above, the volume and the frequency pattern of the non-audible sound can be identified based on the volume information of the ambient sound and the frequency information. In one example, the volume of the identified non-audible sound may be of a volume that exceeds a predetermined threshold above the volume of the ambient sound. Here, the predetermined threshold value may be the smallest value among the volume increase values that can achieve the non-audible communication at a success rate of 99.9% at a distance of 10 m as described with reference to FIG. 4, but are not limited thereto.

Then, information including identified volume and frequency pattern of the non-audible sound can be broadcast in step S820. According to an exemplary embodiment, as described in FIG. 7, the identification information of the electronic device 200 may be broadcast.

The electronic device 200 outputs the non-audible sound in the volume and frequency pattern of the non-audible sound identified by the remote controller 100 in step S830. At this time, it is possible to identify that the remote controller 100 has not received the non-audible sound of the frequency pattern broadcasted within a predetermined time since broadcasting in step S840.

The remote controller 100 may update information on the volume and frequency of ambient sound in step S850 and generate instructions to adjust the non-audible sound which is to be output based on the updated ambient sound in step S860.

Specifically, when the ambient sound is changed by the external noise, the non-audible sound output from the electronic device 200 may not be received. Accordingly, information on the ambient sound can be input again, and instructions including information on the volume value of the new on-audible sound and the frequency pattern can be generated.

Thereafter, when a signal including the generated non-audible adjustment instructions is broadcast in step S870, the electronic device 200 may output the non-audible sound based on the updated ambient sound information in step S880.

Meanwhile, according to another embodiment of the present disclosure, the process of updating the information on the volume and frequency of the surround sound in step S850 may be omitted. For example, there is an obstacle between the remote controller 100 and the electronic device 200, and communication may not be available. In this case, it is not necessary to update the information about the ambient sound. Thus, instead of generating an instruction to adjust the non-audible output in step S860 based on the updated ambient sound, it is possible to generate (not shown) instructions to increase the volume of the non-audible sound output from the electronic device 200.

Specifically, the instructions for adjusting the volume of the non-audible signal may be instructions including volume information exceeding the volume of the non-audible sound initially identified in the remote controller 100 in step S810. If there is an obstacle between the remote controller 100 and the electronic device 200, the volume of the non-audible sound needs to be sufficiently large so that the communication will be effective.

According to an embodiment of the present disclosure, the upwardly adjusted volume may be a predetermined size value. For example, the predetermined size value may be such that the noise of the audible range included in the non-audible sound is output below a predetermined value. This is to prevent a user from recognizing noise in the audible range.

Then, when a signal including the instructions to adjust the volume of non-audible sound upward is broadcast (not shown), the electronic device 200 may output (now shown) the non-audible sound which corresponds to the upward-adjusted volume value.

According to an embodiment of the present disclosure, the above-described process can be applied to a case where the non-audible sound having the frequency pattern identified by the remote controller 100 is not received beyond a predetermined degree of matching. That is, the present disclosure can be applied to a case in which the non-audible sound is not received in step S840, or the non-audible sound is not received by the external noise or obstacle by more than a predetermined degree of matching.

Further, die above-described process can be repeated again after broadcasting a signal including an instruction for broadcasting non-audible adjustment instructions in step S870 or adjusting the volume of the non-audible sound (not shown). That is, it can be repeated until the remote controller 100 receives the frequency pattern of the non-audible sound at a predetermined degree of matching.

Figure 9:
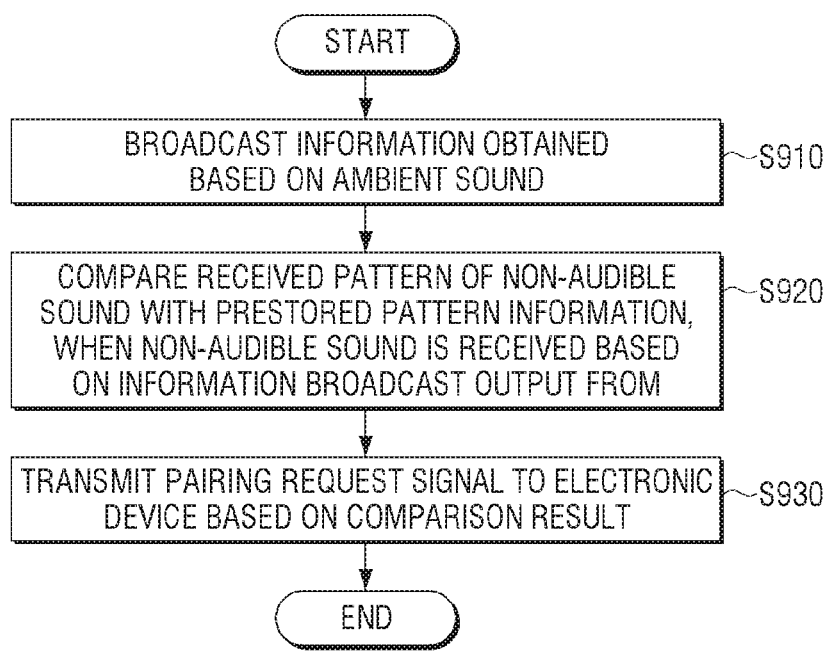
FIG. 9 is a flowchart to describe a controlling method of a remote controller according to an exemplary embodiment.

FIG. 9 is a flowchart to describe a controlling method of a remote controller according to an exemplary embodiment.

According to one embodiment of the present invention, after the remote controller 100 acquires the ambient sound through the microphone 110, the processor 140 broadcasts information on the volume and frequency pattern of the non-audible sound that is obtained based on the ambient sound in step S910.

Thereafter, when the non-audible sound which is based on broadcast information that is output from the electronic device 20 is received, a pattern of the received non-audible sound and prestored pattern information are compared in step S920.

Then, based on the comparison result, the remote controller 100 transmits a pairing request signal to the electronic device 200 in step S930.

Accordingly, the remote controller 100 and the electronic device 200 can be paired.

Figure 10:
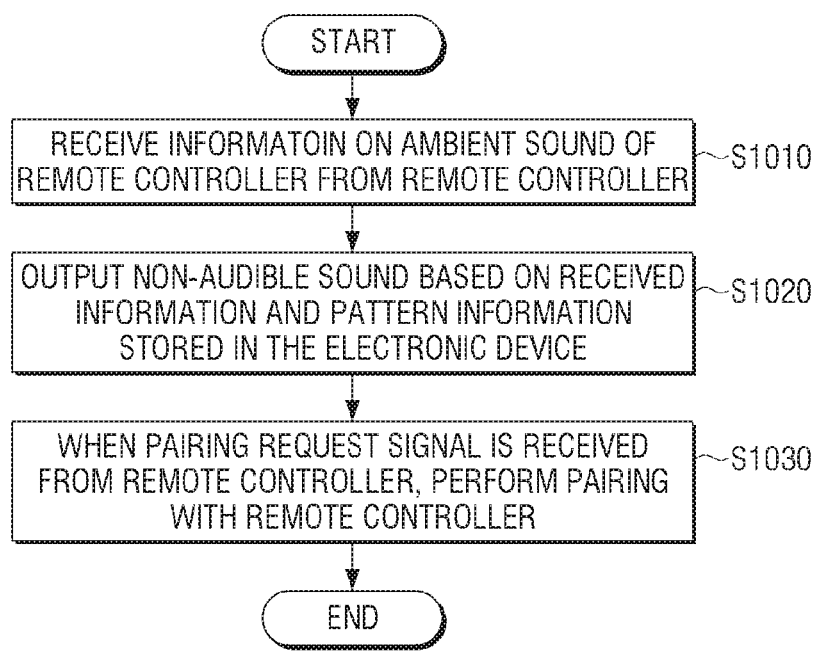
FIG. 10 is a flowchart to describe a controlling method of an electronic device according to an exemplary embodiment.

FIG. 10 is a flowchart to describe a controlling method of an electronic device according to an exemplary embodiment.

According to an exemplary embodiment, the electronic device 200 receives information on the ambient sound of the remote controller 100 from the remote controller 100 in step S1010.

Thereafter, the non-audible sound based on the received information and the pattern information stored in the electronic device 200 is output in step S1020. Here, the received information may include information on the volume information of the non-audible sound and the frequency pattern. In addition, the non-audible sound based on the stored pattern information may be non-audible for one frequency pattern among various frequency patterns stored in the electronic device 200 corresponding to information on the received frequency pattern.

Then, when the pairing request signal is received from the remote controller 100, pairing can be performed with the remote controller 100 in step S1030.

Figure 11:
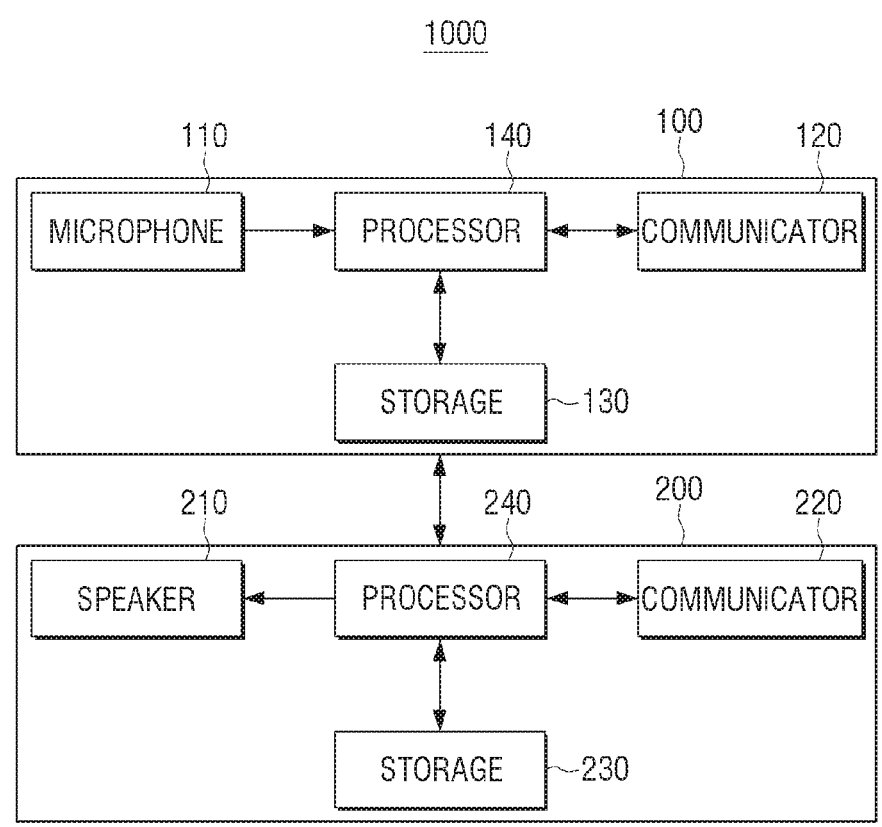
FIG. 11 is a block diagram to describe an electronic system according to an exemplary embodiment.

FIG. 11 is a block diagram to describe an electronic system according to an exemplary embodiment.

The microphone 110 of the remote controller 100 can receive ambient sound. The processor 140 may identify volume information and frequency information of the ambient sound based on the received ambient sound. The processor 120 may then identify the volume and frequency pattern of the non-audible sound to be output from the speaker 210 based on at least one of volume information of ambient sound and frequency information. Here, the frequency patterns may be stored in the storages 140 and 240 of the remote controller 100 and the electronic apparatus 200, respectively, in order to check whether the frequency pattern of the non-audible sound outputted from the speaker 210 coincides with the frequency pattern identified by the processor 140. Thereafter, the processor 140 may broadcast information on the volume and frequency pattern of the identified non-audible sound through the communicator 120.

The electronic device 200 may receive a broadcast signal through the communicator 220. The processor 240 may generate non-audible sound which corresponds to the volume and the frequency pattern of the received non-audible sound.

The processor 240 controls the speaker 210 to output the generated non-audible sound. Thereafter, the processor 110 of the remote controller 100 compares the pattern of the received non-audible sound with the pattern stored in the storage 130. As another example, the processor 110 may compare the pattern of received non-audible signals with the identified frequency pattern for output from the speaker 210.

After comparison, if two patterns are greater than or equal to a predetermined degree of matching, the processor 240 may identify that locality identification is completed and transmit the pairing request signal to the electronic device 200.

It is without a question that the remote controller 100 and the electronic device 200 of the electronic system 1000 may operate in the same manner as what is described in FIGS. 1 to 10.

Meanwhile, at least some of the methods according to various embodiments of the present disclosure described above may be implemented in the form of an application that can be installed in at least one of the existing electronic device and the remote controller.

In addition, at least some of the methods according to various embodiments of the present invention described above may be implemented with only software upgrades, or hardware upgrades, on at least one of the existing electronic devices and remote controllers.

Further, at least some of the various embodiments of the present disclosure described above may be implemented through an embedded server provided in at least one of the electronic device and the remote controller, or an external server of at least one of the electronic device and the remote controller.

At least some of the various embodiments described above may be implemented in a recording medium that can be read by a computer or similar device using software, hardware, or a combination thereof. In some cases, at least some of the embodiments described herein may be implemented by the processor itself. According to a software implementation, at least some of the embodiments, such as the procedures and functions described herein, may be implemented with separate software modules. Each of the software modules may perform one or more of the functions and operations described herein.

Meanwhile, computer instructions for performing at least one of the processing operations of the electronic device and the remote controller according to various embodiments of the present disclosure described above may be stored in a non-transitory computer-readable medium. The computer instructions stored in this non-volatile computer-readable medium cause a particular device to perform processing operations in at least one of the electronic device and the remote controller according to various embodiments described above when executed by a processor of the particular device.

The non-transitory computer readable medium refers to a medium that stores data semi-permanently rather than storing data for a very short time, such as a register, a cache, a memory or etc., and is readable by an apparatus. In detail, the aforementioned various applications or programs may be stored in the non-transitory computer readable medium, for example, a compact disc (CD), a digital versatile disc (DVD), a hard disc, a Blu-ray disc, a universal serial bus (USB), a memory card, a read only memory (ROM), and the like, and may be provided.

The foregoing embodiments and advantages are merely exemplary and are not to be construed as limiting the present disclosure. The present disclosure can be readily applied to other types of apparatuses. Also, the description of the embodiments of the present disclosure is intended to be illustrative, and not to limit the scope of the claims, and many alternatives, modifications, and variations will be apparent to those skilled in the art.

What is claimed is:

1. A remote controller comprising:
a microphone;
a communicator;
a storage configured to store pattern information of non-audible sound; and
a processor configured to control the remote controller to:
broadcast a communication connection request signal,
based on response signals with respect to the communication connection request signal being received respectively from a plurality of external electronic devices including an electronic device, broadcast, through the communicator, a signal including identification information of the electronic device and information obtained based on ambient sound received by the microphone, based on a volume of a corresponding response signal,
receive non-audible sound output by the electronic device based on the broadcast signal, through the microphone,
compare pattern information of the received non-audible sound and the pattern information stored in the storage, and
based on the comparing, transmit a pairing request signal to the electronic device, through the communicator.

2. The remote controller of claim 1, wherein the processor is configured to control the remote controller to:
identify at least one of a second volume or a second frequency for the non-audible sound based on at least one of a first volume or a first frequency of the ambient sound, and wherein the broadcast information includes information about at least one of the identified second volume or second frequency.

3. The remote controller of claim 1, wherein the communication connection request signal is broadcast through a Bluetooth Undirected Advertisement packet, and the signal including the identification information of the electronic device and the obtained information is transmitted through a Bluetooth Directed Advertisement packet.

4. The remote controller of claim 1, wherein the obtained information comprises information about a volume of the ambient sound, and
wherein the processor is configured to control the remote controller to:
based on not receiving the non-audible sound within a predetermined time after broadcasting the signal including the identification of the electronic device and the obtained information, update information about the volume of the ambient sound, and broadcast another signal including the identification information of the electronic device and information about a volume of the updated ambient sound.

5. The remote controller of claim 1, wherein the processor is configured to control the remote controller to:
obtain a volume which exceeds a predetermined threshold than a volume of the ambient sound as a volume of the non-audible sound, and
based on not receiving the non-audible sound within a predetermined time after broadcasting a size of the obtained non-audible sound and the identification information of the electronic device, broadcast instructions to adjust identification information of the electronic device and volume of the non-audible sound upward.

6. A controlling method of a remote controller, the method comprising:
broadcasting a communication connection request signal;
based on response signals with respect to the communication connection request signal being received respectively from a plurality of external electronic devices including an electronic device, broadcast, through a communicator, a signal including identification information of the electronic device and information obtained based on ambient sound received by the microphone, based on a volume of a corresponding response signal;
receiving non-audible sound output by the electronic device based on the broadcast signal;
comparing pattern information of the received non-audible sound and pre-stored pattern information; and
based on the comparing, transmitting a pairing request signal to the electronic device through the communicator.

7. The controlling method of claim 6, further comprising:
identifying at least one of a second volume or a second frequency for the non-audible sound based on at least one of a first volume or a first frequency of the ambient sound, and wherein the broadcast information includes information about at least one of the identified second volume or second frequency.

8. The controlling method of claim 6, wherein the communication connection request signal is broadcast through a Bluetooth Undirected Advertisement packet, and the signal including the identification information of the electronic device and the obtained information is transmitted through a Bluetooth Directed Advertisement packet.

9. The controlling method of claim 6,
wherein the obtained information comprises information about a volume of the ambient sound, and
the method further comprises:
based on not receiving the non-audible sound within a predetermined time after broadcasting the signal including the identification of the electronic device and the obtained information, updating information about the volume of the ambient sound, and broadcasting another signal including the identification information of the electronic device and information about a volume of the updated ambient sound.

10. The controlling method of claim 6, further comprising:

obtaining a volume which exceeds a predetermined threshold than a volume of the ambient sound as a volume of the non-audible sound; and based on not receiving the non-audible sound within a predetermined time after broadcasting a size of the obtained non-audible size and the identification information of the electronic device, broadcasting instructions to adjust identification information of the electronic device and volume of the non-audible sound upward.

* * * * *